United States Patent [19]

Germann, deceased et al.

[11] 4,410,998

[45] Oct. 18, 1983

[54] CURRENT SUPPLY DEVICE FOR ELECTRICALLY HEATING A MOLTEN MEDIUM

[75] Inventors: Fritz Germann, deceased, late of Rüthen, Fed. Rep. of Germany, by Ingeborg Germann, heiress; Eduard Kuntz, Arnsberg, Fed. Rep. of Germany; Reinhold Müller, Büren, Fed. Rep. of Germany; Horst Scholz, Warstein, Fed. Rep. of Germany

[73] Assignee: Licentia Patent-Verwaltungs-GmbH, Frankfurt am Main, Fed. Rep. of Germany

[21] Appl. No.: 265,574

[22] Filed: May 20, 1981

[30] Foreign Application Priority Data

May 20, 1980 [DE] Fed. Rep. of Germany ....... 3019133

[51] Int. Cl.[3] ............ C03B 5/027

[52] U.S. Cl. ............ 373/40

[58] Field of Search ............ 373/39, 40, 135, 136

[56] References Cited

U.S. PATENT DOCUMENTS 3,182,112 5/1965 Torok ............ 373/40

4,049,899 9/1977 Shimizu et al. ............ 373/40

*Primary Examiner*—Roy N. Envall, Jr.

*Attorney, Agent, or Firm*—Spencer & Kaye

[57] ABSTRACT

A system for generating in-phase alternating current components which are fed into a medium held in a melting trough and flow in the medium between electrodes and counterelectrodes immersed in the medium to effect resistance heating. One embodiment of the system includes a supply voltage source, and a plurality of transformers each having a primary winding and a secondary winding, with the primary windings being connected together in series and to the source, each secondary winding being connected between a respective electrode and counterelectrode to provide a respective alternating current component, and each winding having a number of turns corresponding to the desired relative amplitudes of the current components. A second embodiment of the system includes a supply voltage source, at least one input transformer having a primary winding connected to the source and at least one secondary winding, and a plurality of additional transformers each having a primary winding and a secondary winding, with the primary windings of the additional transformers being connected together in series and in a closed loop, each secondary winding of the input transformer being connected in series with at least one secondary winding of the additional transformers between a respective electrode and counterelectrode to provide a respective alternating current component, and each winding of the additional transformers having a number of turns corresponding to the desired relative amplitudes of the current components.

5 Claims, 3 Drawing Figures

CURRENT SUPPLY DEVICE FOR ELECTRICALLY HEATING A MOLTEN MEDIUM

BACKGROUND OF THE INVENTION

The present invention relates to a current supply device for electrically heating a molten medium, or melt, which is disposed in a melting trough, by means of in-phase alternating currents which are fed into the melt via one or a plurality of secondary windings of one or a plurality of individual transformers and which penetrate the melt through electrodes and counterelectrodes immersed therein.

Such current supply devices can be used for heating molten media of the kind that offer an ohmic resistance to the heating current and thus constitute a resistive load. Such devices are used, for example, in glass and salt melts.

The molten medium disposed in a melting trough receives its heating current from an a.c. current source via a transformer or a plurality of individual transformers having a plurality of secondary windings and further via electrodes which are immersed in the medium, and the current is removed from the medium via counterelectrodes which are likewise immersed therein. The electrode arrangement causes the heating current to be divided into a number of component alternating currents corresponding to the number of electrode and counterelectrode pairs and distributed in cross section through the molten medium.

The current supply devices employed must assure that the electrodes and counterelectrodes receive current loads which are as identical as possible so that in operation they are consumed at the same rate and thus all participating electrodes have as nearly as possible the same service life.

However, attainment of identical current loads on the electrodes is difficult since the distribution of the component alternating currents is nonuniform and fluctuates due to differences and changes of local conditions in a melt. In current supply devices in such use, the component alternating currents are electrogalvanically separated from one another, and are each fed from one secondary winding of a transformer, as mentioned above, or are fed from individual transformers. In these devices a static alternating current switch is connected ahead of every individual transformer so that it is possible to individually set the component alternating currents, but the costs involved become considerable as do the difficulties in regulation due to the mutual influence between the individual currents and current paths.

Finally there are electrodes and counterelectrodes which are arranged in pairs spatially offset with respect to one another, each connected to a secondary winding of a transformer having a common primary winding or to a respective individual transformer, in which case a plurality of current paths or the current paths of a pair of component currents may intersect so that differences between component alternating currents due to local conditions in the melt are reduced.

All of the above-described measures taken to provide current loads which are as identical as possible on the electrodes are still not fully sufficient for this purpose.

SUMMARY OF THE INVENTION

It is therefore an object of the present invention to provide a current supply device of the above-described type in which the electrodes are subjected, in a simple manner, to identical current loads or to current loads in which the component currents have a desired magnitude ratio to one another if it is desired to set a certain temperature gradient in the melt.

The above and other objects are achieved, according to the invention, by a system for generating in-phase alternating current components which are fed into a medium held in a melting trough and flow in the medium between electrodes and counterelectrodes immersed in the medium to effect resistance heating, which system includes a supply voltage source and a plurality of transformers each having a primary winding and a secondary winding, with the primary windings being connected together in series and to the source, each secondary winding being connected between a respective electrode and counterelectrode to provide a respective alternating current component, and each winding having a number of turns corresponding to the desired relative amplitudes of the current components.

The objects are further achieved, according to another embodiment of the invention, by constituting the system by a supply voltage source, means defining at least one input transformer having a primary winding connected to the source and at least two secondary windings, and a plurality of additional transformers each having a primary winding and secondary windings, with the primary windings of the additional transformers being connected together in series and in a closed loop, and each secondary winding of the input transformer being connected in series with at least one secondary winding of the additional transformers between a respective electrode and counterelectrode to provide a respective alternating current component, and each winding of the additional transformers having a number of turns corresponding to the desired relative amplitudes of the current components.

In such transformers, one and only one alternating current of a certain magnitude flows through all of the primary windings. This automatically generates in the secondary windings alternating currents having amplitude ratios corresponding to the relation between the transformation ratios of their associated transformers. Corresponding to the regions of the molten medium through which the individual secondary currents flow, the voltages across the secondary windings may be of different magnitudes.

The same effect, with the result that again all electrodes and counterelectrodes participating in the heating process receive identical current loads, can also be achieved with a current supply device which includes a conventional transformer according to the prior art discussed above having one primary winding and a plurality of secondary windings coupled thereto or individual transformers wherein, according to an alternative solution within the framework of the invention, one or a plurality of secondary windings of an additional transformer are each connected in series with one secondary winding of the conventional transformer or of the individual transformers and the primary windings of the additional transformers are connected together in series, with the ends of the series arrangement conductively connected together. These primary windings and their associated secondary windings each have the same number of windings or a winding ratio determined in such a manner that alternating component currents of the desired magnitude ratio result.

If in this device the secondary windings of the conventional transformer have alternating component currents of different magnitudes, induced therein, with the voltages across these secondary windings being identical, different magnitudes of voltages, corresponding to the above-mentioned alternating component current magnitudes, are produced across the secondary windings of the additional transformers. These voltages also have different polarities due to the fact that the primary partial windings are short-circuited in series. These voltages are combined with the voltages across the secondary windings of the conventional transformer to form a total voltage which causes all of the component currents to become identical in magnitude.

According to a further solution offered by the invention, depending on the desired number of component currents in a heating current penetrating a molten medium, a corresponding number of transformers are connected in such a manner that the current flowing through the series-connected primary windings determines, at the secondary windings, the desired number of component currents which are either identical in magnitude or have a given ratio to one another.

If the component currents are to be kept constant, it is sufficient to keep the current flowing through the primary windings constant and, according to a further feature of the invention, to associate with the primary windings an alternating current setting member which includes two thyristors connected in parallel opposition and which cooperates with a regulator designed to keep constant the alternating current supplied to the primary windings.

The transformers according to the invention have the characteristics of a current transformer so that malfunctions in operation, such as the particularly dangerous excess voltages which occur at the secondary side if one component current is interrupted, are avoided.

According to another feature of the invention, each secondary winding of the transformers is connected in parallel, as a safety measure, with a bidirectionally acting excess voltage limiter which is connected in series with a respective current detecting member. The outputs of the current detecting members are connected with a common signal line which is in turn connected to an interference evaluator which influences the current regulator.

Included among the advantages offered by the invention are that but a few changes in the circuit design and in the design of the transformers of a current supply device according to the prior art are needed to produce a considerable operating improvement.

DESCRIPTION OF THE PREFERRED EMBODIMENTS

Figure 1:
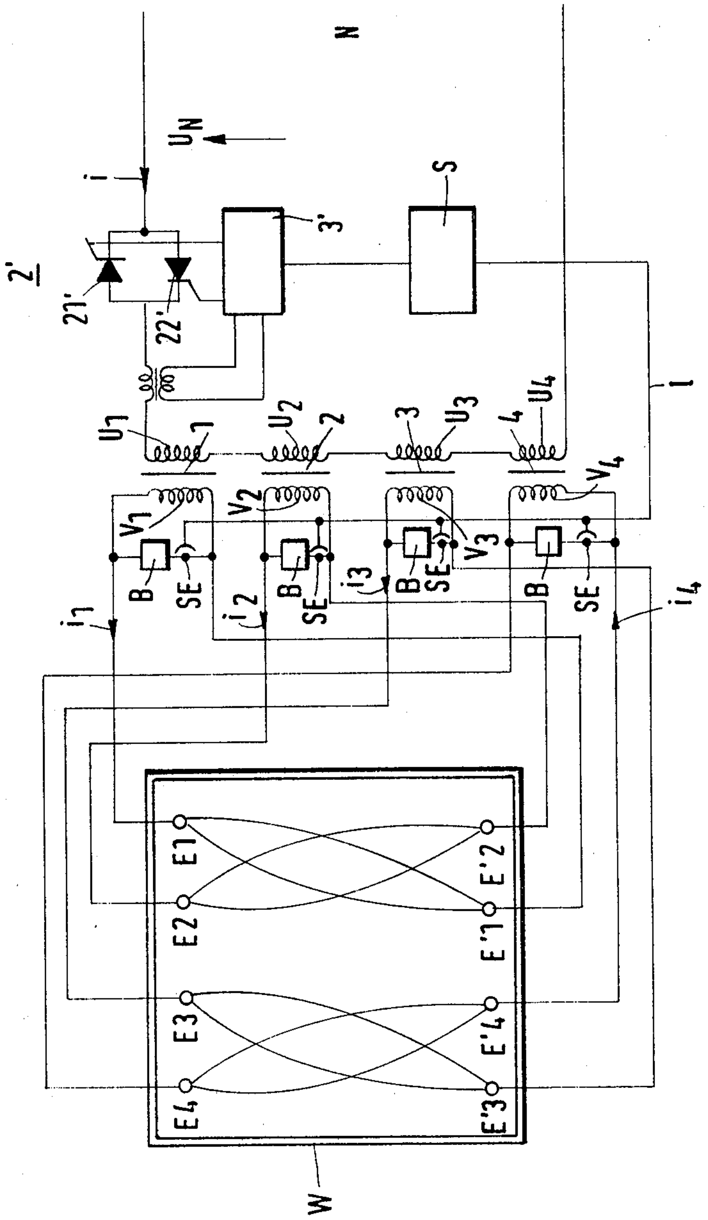
FIGS. 1–3 are schematic diagrams of preferred embodiments of current supply devices according to the invention.

FIG. 1 shows a current supply device having transformers according to the invntion for heating a glass melt by means of confined component currents which are kept constant.

Figure 2:
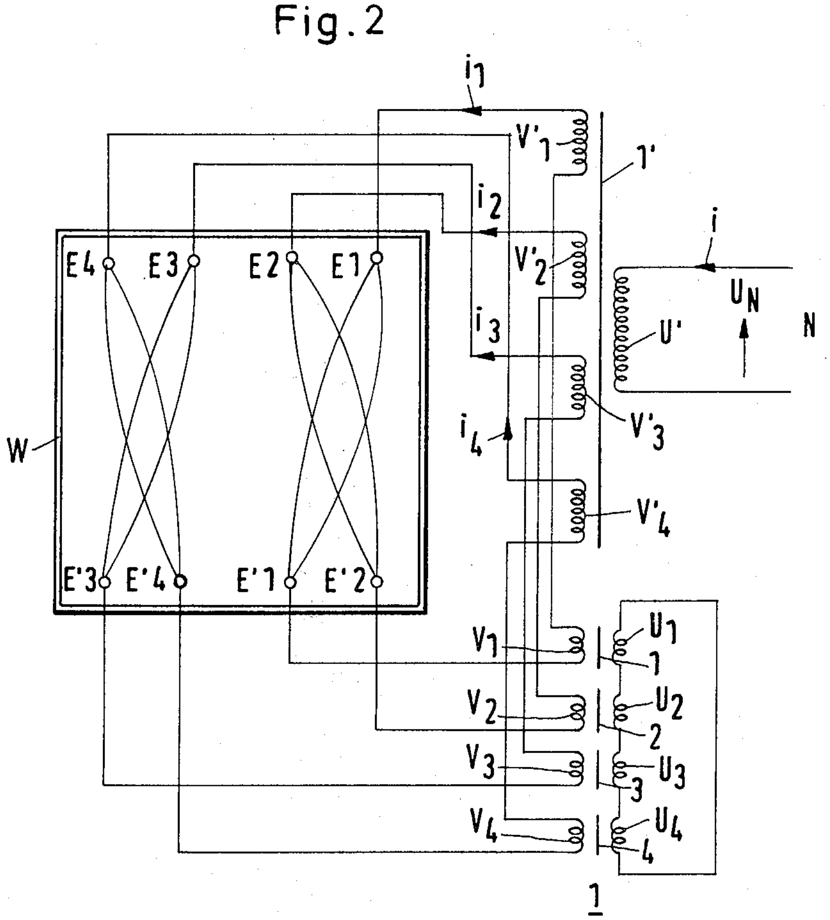

FIG. 2 shows a current supply device for heating a glass melt as in FIG. 1 wherein one transformer according to the prior art is employed as well as transformers according to the present invention.

Figure 3:
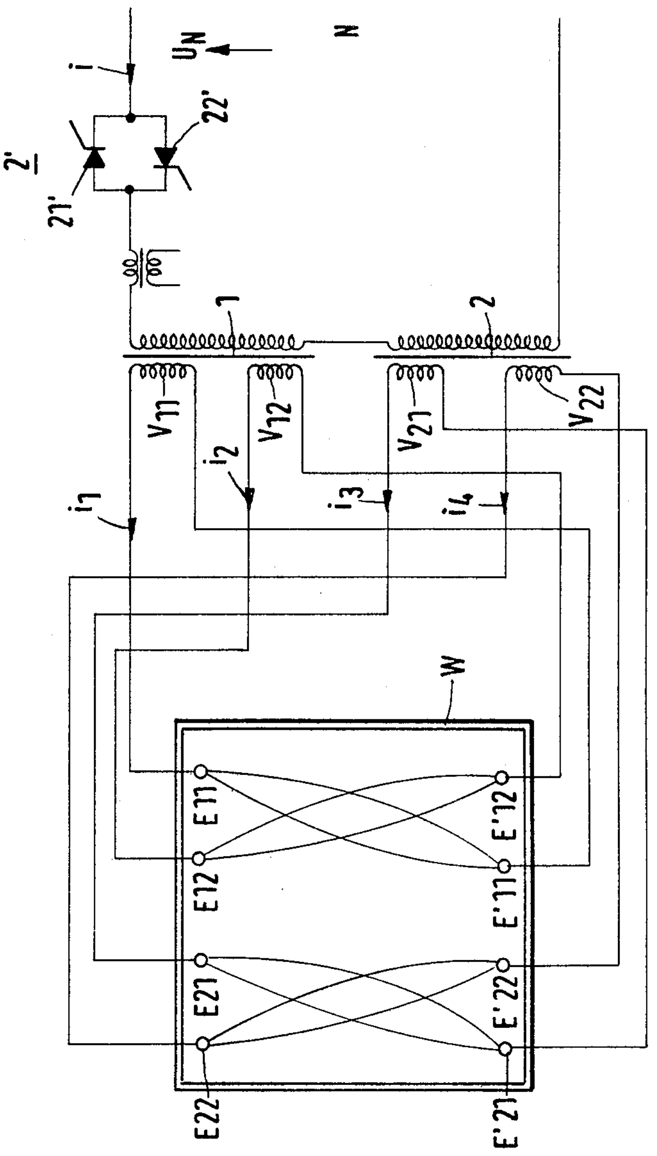

FIG. 3 shows a current supply device for heating a glass melt as in FIG. 1 wherein two transformers according to the invention are employed.

The same elements bear the same reference numerals in all Figures.

In the device according to FIGS. 1 and 2, a molten glass mass to be heated is disposed in a melting trough W, which is shown in plan view. Alongside two opposed walls of the trough, four rod-shaped electrodes E or E′, made for example of graphite, are arranged in a row and are immersed in the glass melt. The electrodes E1, E2, E3 and E4 are disposed in the upper row and the counterelectrodes E′1, E′2, E′3 and E′4 are arranged in the lower row. All electrodes are arranged in their rows with the same spacing therebetween and each electrode E1, E2, E3 and E4, faces its associated counterelectrode E′1, E′2, E′3 and E′4, again with the same spacing between facing electrodes and counterelectrodes. Four pairs of electrodes E1, E′1; E2, E′2; E3, E′3 and E4, E′4, are thus provided, with each pair being composed of an electrode E and a counterelectrode E′, each offset in its row with respect to its associated electrode of the other row, and each connected, via two current conductors, to a respective one of four windings delivering four in-phase alternating currents $i_1$, $i_2$, $i_3$ and $i_4$ into the glass melt in order to heat it. Each component current is composed of current paths which, as indicated in FIGS. 1 and 2 have a convex outline and diverge from the entrance electrodes E and converge toward the counterelectrodes E′. During passage through the glass melt, the component currents $i_1$ and $i_2$ intersect, as do the component currents $i_3$ and $i_4$. Such an arrangement may be advisable to realize the most favorable operating conditions in dependence on the shape of trough W and the melting process.

However, it is important to be able to set the component currents fed into the various volume regions of the melt through the above-mentioned electrodes independently of the local conditions in the glass melt and of the resulting electrical resistance and to keep them constant as well during the heating process so that all electrodes and counterelectrodes are always given the same current load. This requirement can be met with the use of current supply transformers which are connected as shown in FIG. 1.

Corresponding to the number, in this case four, of component currents to be provided at the secondary side, four transformers 1, 2, 3 and 4 are provided. Each transformer has its own transformer core, primary winding u1, u2, u3 or u4, and secondary winding v1, v2, v3 or v4. The four primary windings have the same number of turns each and are connected together in series. However, the four secondary windings are not connected to one another. They also have the same number of turns as one another, which number is fixed at a selected ratio to the number of turns of each of the four primary windings. As explained above and shown in FIG. 1, the four pairs of electrodes which are immersed in the glass melt are connected to these secondary windings. Thus there exist four component current circuits having four ohmic resistances which are given by the state of the melt between the respective electrodes.

If now the series connection of the primary windings is connected to an alternating current source, e.g. to the alternating current mains, the four primary windings receive a primary current whose magnitude is dependent on the mains voltage $u_N$. Thus the secondary windings conduct component currents $i_1$ through $i_4$ all of the same magnitude, if, as stated as a condition above, the ratio of the number of turns of the primary windings and of the secondary windings is the same in all transformers. Now the secondary currents are no longer dependent on the resistance in the glass melt but rather the resistance influences the voltage distribution across the four primary windings.

It is now only necessary to keep the primary current constant in order to cause the secondary currents to also become constant in time and independent on the mains voltage. This is done, according to FIG. 1, with the aid of an alternating current setting member 2', including two thyristors 21' and 22' connected in parallel opposition and cooperating with a current regulator 3'. Member 2' is connected in series with the primary windings u1–u4, while regulator 3' has an input inductively coupled to that series path to sense the level of current therein.

Current regulators and alternating current setting devices of the kind, as specified above, are manufactured and sold under the designations Thyrovar ITEAL Thyrotakt MTL by AEG-TELEFUNKEN AKTIENGESELLSCHAFT, Horkamp 30, D-4788 Warstein 2 Belecke.

The requirement for four component currents $i_1$ through $i_4$ of identical magnitude can also be met in a current supply device as shown in FIG. 2 including a conventional transformer 1', if in this arrangement, each secondary winding v'1, v'2, v'3, and v'4 of transformer 1' is connected in series with an additional secondary winding v1, v2, v3 or v4 of a respective one of the transformers 1, 2, 3 and 4 which are constructed as described above with reference to FIG. 1.

Thus the four pairs of electrodes E1, E'1; E2, E'2; E3, E'3; and E4, E'4 are each connected to two series connected transformer secondary windings. Moreover, the transformers 1, 2, 3, 4 must be short-circuited at their primary sides, i.e. the ends of the series connection of the four primary windings u1, u2, u3 and u4 must be short-circuited together.

If now the primary winding u' of the transformer 1' is connected to the alternating current source, i.e., mains N, the primary winding u' receives a primary current which corresponds to the sum of the four partial currents $i_1$ through $i_4$ in the four secondary windings v'1 to v'4 which partial currents may be of different magnitudes depending on the electrical resistance of the current paths in the glass melt in the individual volume regions.

Since each component current flows through a respective secondary winding of the transformers 1 through 4 whose primaries are short-circuited, different voltages are induced across the partial primary windings corresponding to the different component currents in the secondary windings v1 to v4, voltages which have different magnitudes and at least one of which has a polarity different from that of the others, since the sum of the induced voltages across the short-circuited series connection of the primary windings must be zero. The result is that the voltage generated across each additional secondary winding v1 to v4 is added to or subtracted from the identical voltage across an associated one of the secondary windings v'1 to v'4 so that all four alternating component currents $i_1$ through $i_4$ are set to be identical.

The circuit arrangement of the transformers 1 through 4 in the device according to FIG. 2 has the additional effect that even if the voltage in the mains N changes the alternating component currents are still set to be identical. But if the requirement is for component currents which remain constant in time, then it is sufficient to have only one alternating current setting member including a constant current regulator according to FIG. 1, which is connected ahead of the primary winding u' of transformer 1'.

Regarding the requirement of being able to set the component currents with a desred slight deviation when the ratio of the number of turns of the primary windings and of the secondary windings of the transformers 1 through 4 is fixed, these transformers are equipped with transformer cores having a low requirement for magnetization, for example tape wound cores, or C cores, made of a grain oriented sheet metal. Cores and core materials of the kind as specified, merely need inducing currents of low intensities for magnetization.

Reverting once again to the embodiment of the transformer circuit according to FIG. 1, this includes components for protecting the circuit against excess voltages which may occur due to malfunctions such as interruption of one or more alternating currents. Each secondary winding v1 to v4 is connected in parallel with a bipolar excess voltage limiter B, known by the name "U diode" or "thyrector," connected in series with an associated current detection member SE having an output. The outputs of all detection members SE are connected to a common signal line, this being a bus line 1, via which the current detection members SE are connected to the input of an interference evaluator S. A current evaluating relay is used as interference evaluator, e.g. a relay manufactured and sold under the designation 1A-RH 1000 by AEG-TELEFUNKEN AKTIENGESELLSCHAFT, Horkamp 30, D-4788 Warstein 2 Belecke.

Thus a current pulse signals every excess voltage occurring across a secondary winding due to a malfunction, this pulse is detected by a detector member SE and is stored by the interference evaluation member S. An output of member S is connected to the above-mentioned current regulator 3'. In the case of a malfunction, the current regulator is influenced by member S in such a manner that, for example, all component currents are switched off directly.

Feeding component currents of identical magnitudes into the glass melt through electrodes and counterelectrodes which are combined into groups is effected with the use of current supply transformers in which two or more secondary windings are associated with each of the primary windings. In the current supply device according to FIG. 3, for example, only two such transformers 1, 2 are used, and the primary winding of each transformer has two associated secondary windings v11 and v12 or v21 and v22. From two of the total of four secondary windings, the alternating component currents $i_1$ and $i_2$ are fed into the glass melt through electrodes E11 and E12 and counterelectrodes E'11 and E'12 and from the other two secondary windings, the other two currents $i_3$ and $i_4$ are fed into the glass melt through electrodes E21 and E22 and associated counterelectrodes E'21 and E'22. These two groups may be immersed in two volume regions of the glass melt which differ considerably, on the average, regarding their ohmic resistance. Nevertheless the four currents $i_1$ through $i_4$ will turn out to be identical. Expediently, the number of turns of each of the four secondary windings v11, v21, v12, v22 in FIG. 3 will be fixed at a selected ratio to the number of turns of the associated primary winding as to have two sums of relative amplitudes of secondary currents $(i_1+i_2)=(i_3+i_4)$, provided that all secondary windings of the transformers have equal numbers of turns. Each sum is equal to the other one, whereas the sums of the currents $(i_1+i_2)$ and $(i_3+i_4)$ which are fed into said volume regions of the melt differ from another.

The present invention is not limited to the embodiments described above in connection with FIGS. 1 through 3, and is not limited generally to the fact that the alternating component currents are all set to be identical. With the use of the present invention, these currents, if required, can also be set at different values in certain volume regions of the melt. This can be done very simply, for example, by setting the winding turn ratio differently for the transformers connected as shown in FIG. 1 and associated with the different volume regions, so as to produce component currents in a glass melt disposed in an elongate trough such that the component currents in the two end regions of the melt are set to be greater than those in the center region.

For the purpose of discussion of the relationship which exists, with respect to the number of winding turns, among the various windings of transformers, it is helpful to keep in mind the ampere turns rule which reads as follows: In a transformer having a primary winding with $n_p$ winding turns and a secondary winding with $n_s$ winding turns the ampere turns $i_p \cdot n_p$ in the primary winding is equal to the ampere turns $i_s \cdot n_s$ in the secondary winding (symbols $i_p$, $i_s$ stands for alternating current in the primary, secondary winding resp.). This applies to a plurality of four transformers, shown in FIG. 1, each having a primary and a secondary winding, all of the primary windings have the same number of turns $n_u$ and all the secondary windings the same number of turns $n_v$, with said primary windings u1, u2, u3, u4 being connected together in series, the primary current i flowing via the primary winding of each of the transformers, resulting in $$i \cdot n_u = i_1 \cdot n_v = i_2 \cdot n_v = i_3 n_v = i_4 n_v$$

from which is seen that each of the primary currents (component currents $i_1$, $i_2$, $i_3$ and $i_4$) are set with same (equal) amplitudes.

The secondary currents, as may be seen from the equations above, can be set to distinct amplitudes by fixing preferably the number of turns $n_v = n_{v1}$, $n_{v2}$, $n_{v3}$, $n_{v4}$ of the secondary windings v1, v2, v3, v4 at selected ratios to the number of turns of the primary windings. However, this evidently may also be effected by fixing the number of turns $n_u$ of the primary windings at corresponding ratios, the secondary windings having the same number of turns to one another. In either case, any relationship which exists between the turns of each primary winding and the turns of the associated secondary winding is determined by the desired relative amplitudes of the secondary currents.

It will be understood that the above description of the present invention is susceptible to various modifications, changes and adaptations, and the same are intended to be comprehended within the meaning and range of equivalents of the appended claims.

What is claimed is:

1. A system for electrically heating a molten medium in a melting trough by in-phase alternating current components which are fed into the medium and flow in the medium between electrodes and counterelectrodes immersed in the medium to effect resistance heating, said system comprising: a supply voltage source; means defining at least one input transformer having a primary winding connected to said source and a plurality of secondary windings; and additional transformer means presenting a plurality of primary windings and a plurality of secondary windings, with said primary windings of said additional transformer means being connected together in series and in a closed loop, and each said secondary winding of said input transformer being connected in series with at least one of said secondary windings of said addtional transformer means between a respective electrode and counterelectrode to provide a respective alternating current component, and each said winding of said additional transformer means having a number of turns corresponding to the desired relative amplitudes of the current components.

2. A system as defined in claim 1 further comprising a current setting member connected in series with said primary winding of said input transformer and composed of two thyristors connected together in parallel opposition, and a regulator connected to said setting member for maintaining the current through said primary winding of said input transformer.

3. A system as defined in claim 1 wherein all of said additional transformer means primary windings have the same number of turns and all of said additional transformer means secondary windings have the same number of turns.

4. A system as defined in claim 1 or 3 wherein said additional transformer means has a number of primary windings equal to the number of secondary windings of said input transformer, and a single secondary winding associated with each said primary winding of said additional transformer means.

5. A system as defined in claim 1 or 3 wherein said additional transformer means has a plurality of secondary windings associated with each said primary winding thereof.

* * * * *